United States Patent
Naukkarinen et al.

(10) Patent No.: US 8,817,476 B2
(45) Date of Patent: Aug. 26, 2014

(54) APPARATUS, ADD-ON MODULE, AND A SYSTEM COMPRISING A HOST APPARATUS AND AN ADD-ON MODULE

(75) Inventors: Samu Naukkarinen, Espoo (FI); Pekka Kilpi, Helsinki (FI)

(73) Assignee: Nokia Corporation, Espoo (FI)

( * ) Notice: Subject to any disclaimer, the term of this patent is extended or adjusted under 35 U.S.C. 154(b) by 777 days.

(21) Appl. No.: 13/001,480

(22) PCT Filed: Jun. 27, 2008

(86) PCT No.: PCT/FI2008/050396
§ 371 (c)(1),
(2), (4) Date: Aug. 21, 2011

(87) PCT Pub. No.: WO2009/156555
PCT Pub. Date: Dec. 30, 2009

(65) Prior Publication Data
US 2011/0292618 A1    Dec. 1, 2011

(51) Int. Cl.
*H05K 7/00* (2006.01)

(52) U.S. Cl.
USPC .......................................................... 361/729

(58) Field of Classification Search
USPC .......................................................... 361/729
See application file for complete search history.

(56) References Cited

U.S. PATENT DOCUMENTS

| | | | |
|---|---|---|---|
| 5,253,139 A | 10/1993 | Satou | |
| 5,303,291 A | 4/1994 | Takagi et al. | |
| 5,924,044 A | 7/1999 | Vannatta et al. | |
| 6,151,486 A | 11/2000 | Holshouser et al. | |
| 7,645,143 B2 * | 1/2010 | Rohrbach et al. | 439/39 |
| 7,762,817 B2 * | 7/2010 | Ligtenberg et al. | 439/38 |
| 8,435,042 B2 * | 5/2013 | Rohrbach et al. | 439/39 |
| 2003/0114032 A1 * | 6/2003 | Sakiyama | 439/181 |
| 2009/0174990 A1 * | 7/2009 | Ligtenberg et al. | 361/679.01 |
| 2010/0184482 A1 | 7/2010 | Ijas et al. | |

FOREIGN PATENT DOCUMENTS

| | | |
|---|---|---|
| EP | 1085397 A2 | 3/2001 |
| FR | 2690588 A1 | 10/1993 |

OTHER PUBLICATIONS

International Search Report and Written Opinion of the International Searching Authority for PCT Application No. PCT/FI2008/050396, dated Mar. 19, 2009, 16 pages.

* cited by examiner

*Primary Examiner* — Forrest M Phillips
(74) *Attorney, Agent, or Firm* — Harrington & Smith (57) ABSTRACT

An apparatus (102) comprises a mechanical interface configured to mechanically receive a module (101) into an assembled configuration. Within said mechanical interface, the apparatus comprises a first connector configured to receive a first matching counterpart in a first insertion direction (103), and a second connector configured to receive a second matching counterpart in a second insertion direction (104), which second insertion direction is the direction of a curvilinear motion and different from said first insertion direction (103). The apparatus (102) comprises a hinge joint between said first connector and a body of the apparatus. The hinge joint has an axis of rotation, which is essentially perpendicular against said second insertion direction (104).

18 Claims, 6 Drawing Sheets

APPARATUS, ADD-ON MODULE, AND A SYSTEM COMPRISING A HOST APPARATUS AND AN ADD-ON MODULE

RELATED APPLICATION

This application was originally filed as PCT Application No. PCT/FI2008/050396 filed on Jun. 27, 2008, which is incorporated herein by reference in its entirety.

FIELD OF THE INVENTION

The invention concerns generally electronic apparatuses and their electromechanical connections. Exemplary embodiments of the invention involve an apparatus configured to receive an add-on module, an apparatus configured to attach as an add-on module to another apparatus, a system comprising a host apparatus and at least one add-on module, and an electromechanical interface between an apparatus and an add-on module.

BACKGROUND OF THE INVENTION

Electronic appliances come with a wide variety of functionalities. In many cases it is not advisable to try implementing all possible functionalities within a single device, because the needs and expectations of different users will vary. Rather, it may be more advantageous to provide a host apparatus with a certain set of basic functionalities, and to separately provide a selection of add-on modules that users may acquire according to their individual needs and use together with the host device. In some cases the hardware components needed for implementing a functionality wear out, discharge, fill up, become obsolete, or otherwise achieve a state of reduced usability faster than some other hardware in the apparatus. Implementing such components in an add-on module facilitates changing and replacing them easily without needing to acquire a new complete apparatus. Also other cases exist in which it is advantageous to couple two parts together with an electromechanical connection to form a combined entity. An electromechanical connection is a way of putting together two or more physical entities, implementing both an electric connection for transferring electric signals in at least one direction between at least two of said physical entities and a mechanical connection for mechanically maintaining at least two of said physical entities within an at least temporarily fixed coupling to each other.

As an example we may consider a portable communications device. Different users have widely differing needs for their portable communications devices, which makes it advantageous to provide at least some of the more advanced or more exotic functionalities in separate add-on modules that can be removably attached to a body part of the device. Even a single user may have different needs at different times, which leads to the same conclusion about add-on modules. Also other portable electronic appliances, such as personal digital assistants, palmtop and laptop computers, digital cameras and camcorders, remote controls, and the like may include modular structures. In some cases it is not reasonable to designate one part of the system a body and the other as an add-on module, because the system merely comprises to apparatuses that can be electromechanically connected together to form a larger entity.

The electromechanical connection between a body part and an add-on module (or between two electronic apparatuses) must meet certain expectations. The connection should be robust and reliable, so that the electric coupling operates undisturbed and the mechanical coupling does not easily come loose by accident. On the other hand the connection must be easy to use, so that a human user perceives making the electromechanical connection and detaching it, when desired, as easy and straightforward. Making a wrong connection (e.g. confusing the polarity of an electric connection, or putting one of the connected parts backwards) should be prevented in a natural way. The electromechanical connection should not place unnecessary restrictions to the freedom of designing other characteristics of the connected apparatuses, such as outer appearance, functional capacity, ergonomics, or interoperability with other devices.

SUMMARY OF SOME EXAMPLES OF THE INVENTION

This summary of some examples of the invention is intended to merely exemplary and non-limiting.

An advantage of a number of exemplary embodiments of the invention is the provision of a robust, reliable and versatile electromechanical interface between an apparatus and an add-on module, or between two apparatuses, that a human user perceives as easy and straightforward to use. Another advantage of a number of exemplary embodiments of the invention is the provision of a robust electromechanical add-on module interface solution for an apparatus. Other advantages of these and other embodiments of the inventions are discusses later in this description.

An apparatus according to one exemplary embodiment of the invention comprises a mechanical interface that is configured to mechanically receive a module into an assembled configuration. Within said mechanical interface, a first connector is configured to receiver a first matching counterpart (located in said module) in a first insertion direction. Also within said mechanical interface, a second connector is configured to receive a second matching counterpart (located in said module) in a second insertion direction. The second insertion direction is the direction of a curvilinear motion and different from said first insertion direction. The apparatus comprises a hinge joint between said first connector and a body of the apparatus.

In an advantageous embodiment said hinge joint has an axis of rotation, which is essentially perpendicular against said second insertion direction.

A module according to one exemplary embodiment of the invention comprises a first matching counterpart configured to be received in a first connector of an apparatus in a first insertion direction, and a second matching counterpart configured to be received in a second connector in a second insertion direction, which second insertion direction is the direction of a curvilinear motion and different from said first insertion direction.

A system according to one exemplary embodiment of the invention comprises an apparatus and a module. In said apparatus, the system comprises a mechanical interface configured to mechanically receive the module into an assembled configuration. Within said mechanical interface, the system comprises a first connector configured to receive a first matching counterpart of the module in a first insertion direction. Also within said mechanical interface, the system comprises a second connector configured to receive a second matching counterpart of the module in a second insertion direction, which second insertion direction is the direction of a curvilinear motion and different from said first insertion direction. The system comprises a hinge joint either between said first connector and a body of the apparatus or between said first matching counterpart and a body of the module. Said hinge joint has an axis of rotation, which is essentially perpendicular against said second insertion direction.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

DETAILED DESCRIPTION OF EMBODIMENTS OF THE INVENTION

In the following description we use the term □apparatus□ in general to refer to an electronic appliance that is configured for receiving a module and/or another apparatus into electromechanical connection. Similarly we use the term □module□ to refer to an electronic appliance or other kind of auxiliary that can be used to augment and/or change at least functionality of another electronic appliance, and that is configured to be received at said other electronic appliance into electromechanical connection. Also the term □add-on module□ is used sometimes to illustrate the fact that electromechanically connecting an apparatus and a module will result in a combined electronic appliance where the module provides an addition to the other functionalities of the apparatus. When the appropriate electromechanical connection between an apparatus and a module has been made, and the two may thus be considered and handled as a single, combined entity, they are said to be in assembled configuration.

Figure 1:
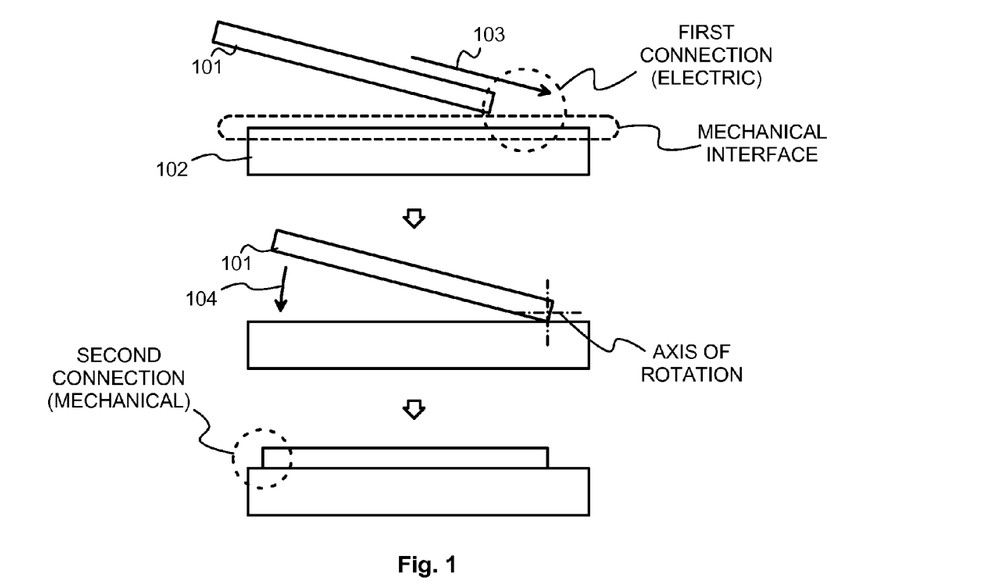
FIG. 1 illustrates an embodiment of attaching a module to an apparatus.

FIG. 1 illustrates one embodiment of attaching, or in more detail electromechanically connecting, a module 101 to an apparatus 102. The upper side of the apparatus 102 comprises a mechanical interface, which is configured to mechanically receive the module 101 into assembled configuration. The upper part of FIG. 1 shows how moving the module 101 obliquely towards the apparatus in a first insertion direction 103 causes a first connection to be made. In order to make the first connection, a first connector (not separately shown) in the apparatus 102 is configured to receive a first matching counterpart (not separately shown) in the module 101. Many connector □ matching counterpart pairs define in a natural way an insertion direction, which may be for example the direction for pushing a □male□ connector into a □female□ receptacle. The first connector in the apparatus 102 and the first matching counterpart in the module 101 must be directed so that their natural insertion direction is parallel with the first insertion direction 103.

In many advantageous embodiments of the invention the first connection involves an electric connection, for which reason we will refer to the first connection as the electric connection, to the first connector as the electric connector, and to the first matching counterpart as the counterpart electric connector in the continuation.

Speaking of a (rectilinear) insertion direction means that making the connection between the electric connector and counterpart electric connector necessitates a movement in that particular direction. For example a pair of planar, essentially parallel conductive pads can be pushed together, but they fail to define any (rectilinear) insertion direction, because the direction of the approaching movement is not critical as long as the plates do not miss touching each other. A natural insertion direction is typically the result of using some kind of a sleeve or cylindrical hollow in one of the two, and a corresponding plug, pin, or other elongated formation in the other. The natural insertion direction is then the direction of the longitudinal axes of the sleeve and plug at the moment of making the connection. The first insertion direction does not need to be rectilinear; as an example, cylindrically symmetric connectors can be used that define a rotating and/or helical natural insertion direction.

The middle part of FIG. 1 shows how the module 101 is moved in a rotating movement around a certain axis of rotation, so that the module 101 approaches the apparatus 102. The rotating movement defines a second insertion direction 104, which is essentially perpendicular against the axis of rotation. The exact location of the axis of rotation, in relation to the surfaces of the module and the apparatus, is not important, but we may assume that since moving the module in the first insertion direction 103 caused the first connector and first matching counterpart to make and remain in contact, the axis of rotation is relatively close to the location of the first connector in the apparatus 102. A hinge joint is needed somewhere close to either the first connector or the first matching counterpart in order to allow and control the rotating movement. The structure and location of the hinge joint define the exact location of the axis of rotation.

The lowest part of FIG. 1 shows how said rotating movement has continued long enough so that module and the apparatus have reached assembled configuration. A second connector (not separately shown) in the apparatus 102 is configured to receive a second matching counterpart (not separately shown) in the module 101 so that together they keep the apparatus and the module together in the assembled configuration. The structure and location of the second connector □ second matching counterpart pair is such that continuing said rotating movement long enough in the second insertion direction will eventually cause or at least allow the second connector to receive the second matching counterpart, so that the two engage and achieve a state in which they resist any withdrawing movement that would separate the module 101 from the apparatus 102. The second insertion direction 104 is the direction of a curvilinear motion, and different from the first insertion direction 103.

In many advantageous embodiments of the invention the second connection is mainly mechanical by nature, for which reason we will refer to the second connection as the mechanical connection, to the second connector as the mechanical connector, and to the second matching counterpart as the counterpart mechanical connector in the continuation.

Making the mechanical interface elongated in shape and placing the electric connector and mechanical connector closer to opposite ends of said elongated shape than to each other involves the advantages of stability and robustness of the connection. The module will be attached at two locations, which are at or close to opposite ends of the elongated shape of the module. Consequently there is no part of the module that would offer a point where an unintended separating force would have a long lever arm to prise against the connection.

Figure 2:
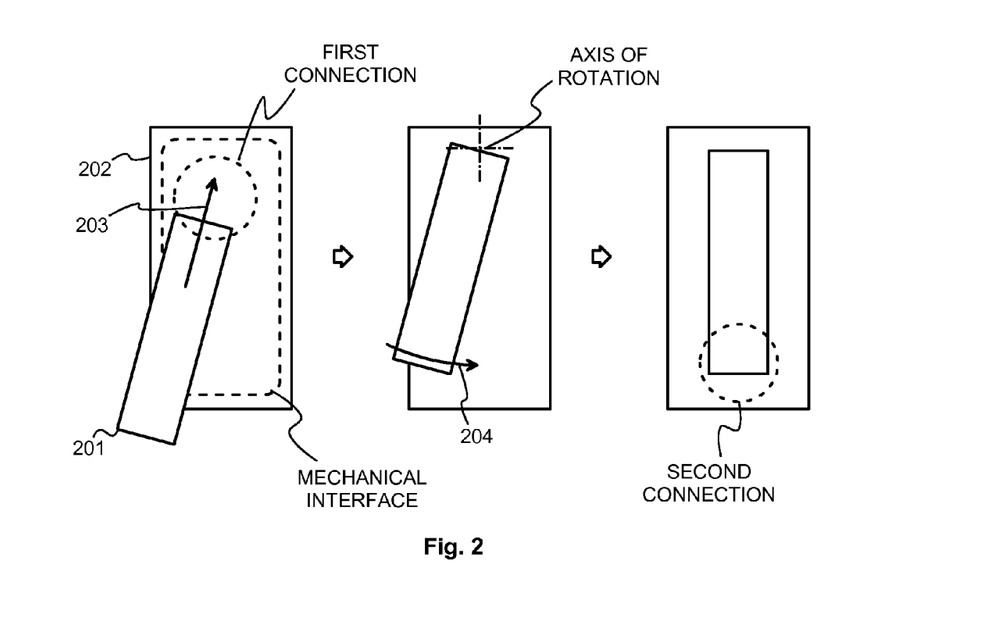
FIG. 2 illustrates another embodiment of attaching a module to an apparatus.

FIG. 2 illustrates another embodiment of electromechanically connecting a module to an apparatus. If FIG. 1 illustrated the parts from a direction that could be called a side, in FIG. 2 they are viewed from above. The leftmost part of FIG. 2 shows how moving the module 201 in a first insertion direction 203 produces an electric connection, where an electric connector (not separately shown) in the apparatus 202 and a matching counterpart electric connector (not separately shown) in the module 201 engage. The first insertion direction 203 is parallel to the surface of the apparatus 202 that comprises the mechanical interface, contrary to FIG. 1 where the first insertion direction was oblique against said surface.

The middle part of FIG. 2 shows how the module 201 is moved in a rotating movement around a certain axis of rotation, so that the longitudinal axes of the module 201 and the apparatus 102 eventually become parallel. The axis of rotation is this time perpendicular against the surface of the apparatus 202 that comprises the mechanical interface, but again its exact location is not important. The rotating movement again defines a second insertion direction 204, which is the direction of the curvilinear motion and essentially perpendicular against the axis of rotation. A hinge joint is again needed somewhere close to either the electric connector or the counterpart electric connector in order to allow and control the rotating movement. The structure and location of the hinge joint define the exact location of the axis of rotation.

The rightmost part of FIG. 2 shows how said rotating movement has continued long enough so that module and the apparatus have reached assembled configuration. A mechanical connector (not separately shown) in the apparatus 202 is configured to receive a matching counterpart mechanical connector (not separately shown) in the module 201 so that together they keep the apparatus and the module together in the assembled configuration. Also in the embodiment of FIG. 2 the structure and location of the mechanical connector □ counterpart mechanical connector pair is such that continuing the rotating movement illustrated by the second insertion direction 204 long enough will eventually cause or at least enable the mechanical connector to engage the matching counterpart mechanical connector, so that as a result they resist any withdrawing movement that would turn the module clockwise against the direction 204 or otherwise separate the module 201 from the apparatus 202. Also here the second insertion direction 204 is different from the first insertion direction 203.

Figure 3:
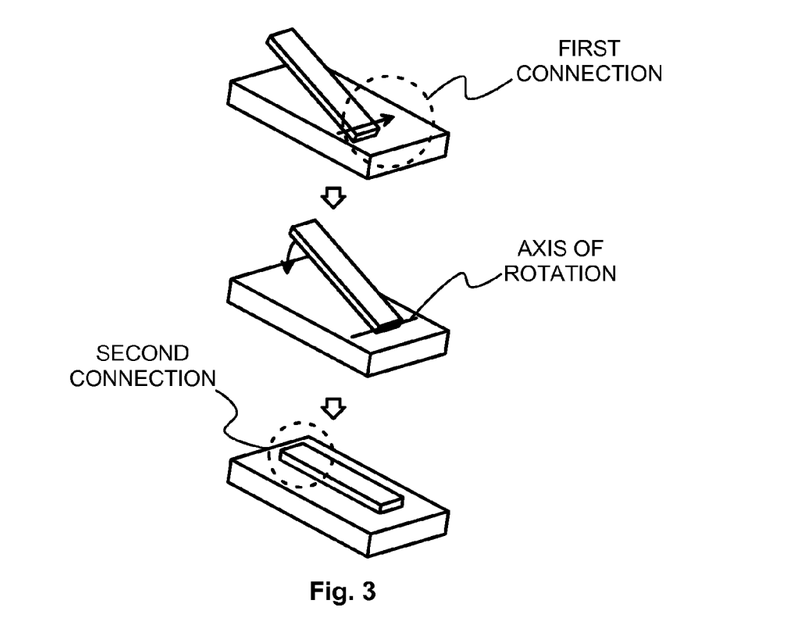
FIG. 3 illustrates another embodiment of attaching a module to an apparatus.
Figure 4:
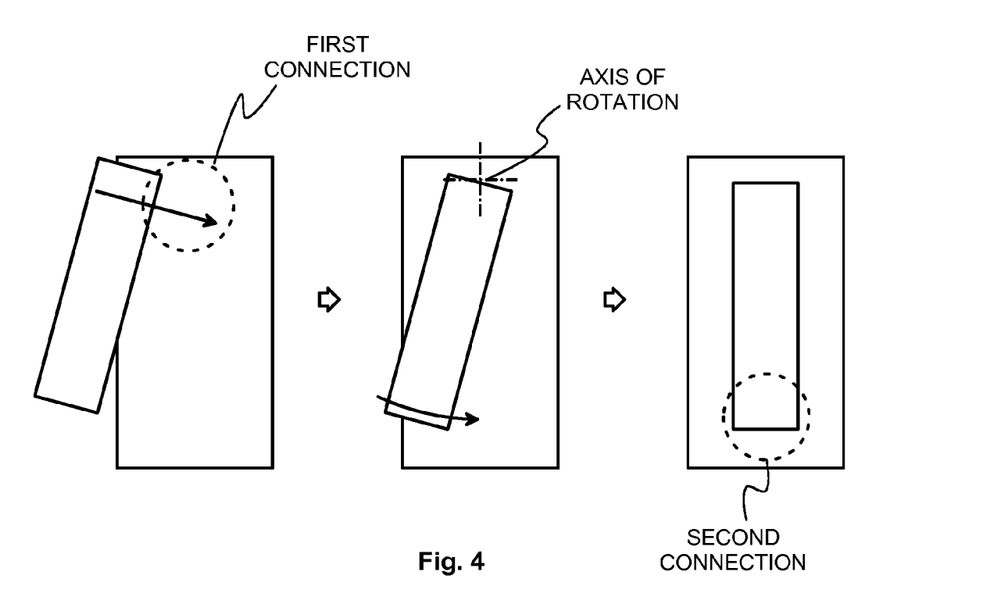
FIG. 4 illustrates another embodiment of attaching a module to an apparatus.

The first insertion direction is not necessarily parallel or even close to the direction of the longitudinal axis of the module and/or the apparatus. FIGS. 3 and 4 illustrate embodiments that otherwise resemble those of FIGS. 1 and 2 respectively but that illustrate a first insertion direction that is perpendicular against the longitudinal axis of the module. In each of FIGS. 3 and 4 the first insertion direction is perpendicular against the longitudinal axis of the module, which means that the electric connector and counterpart electric connector (not separately shown) in the module and the apparatus must be directed appropriately. In the embodiment of FIG. 4, even if also the rotating movement illustrated by the second insertion direction 401 could be said to be perpendicular against the longitudinal axis of the module, the first and second insertion directions are still different because one is the direction of a linear movement while the other is the direction of a curvilinear motion.

Figure 5:
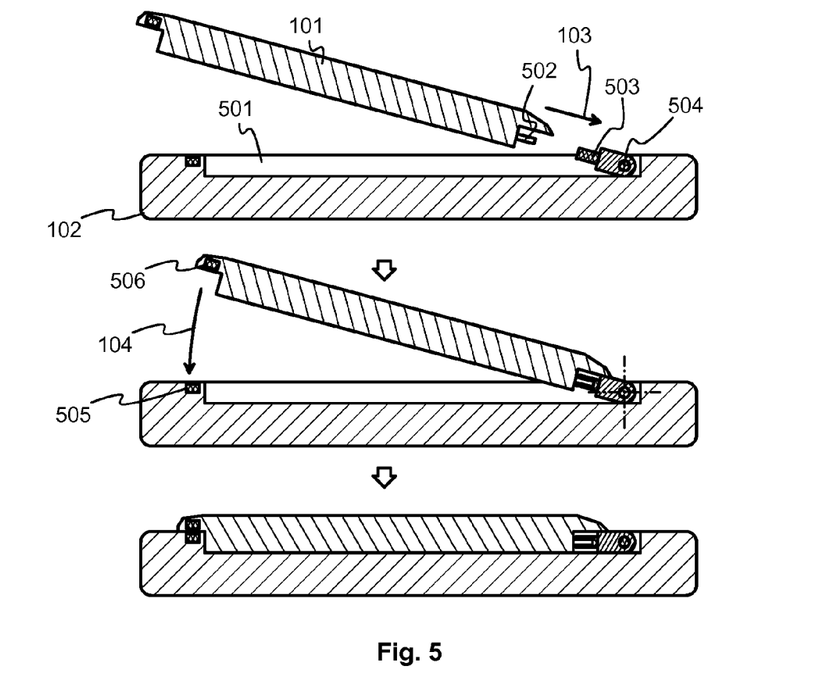
FIG. 5 illustrates one way of implementing the principle of FIG. 1 in practice.
Figure 6:
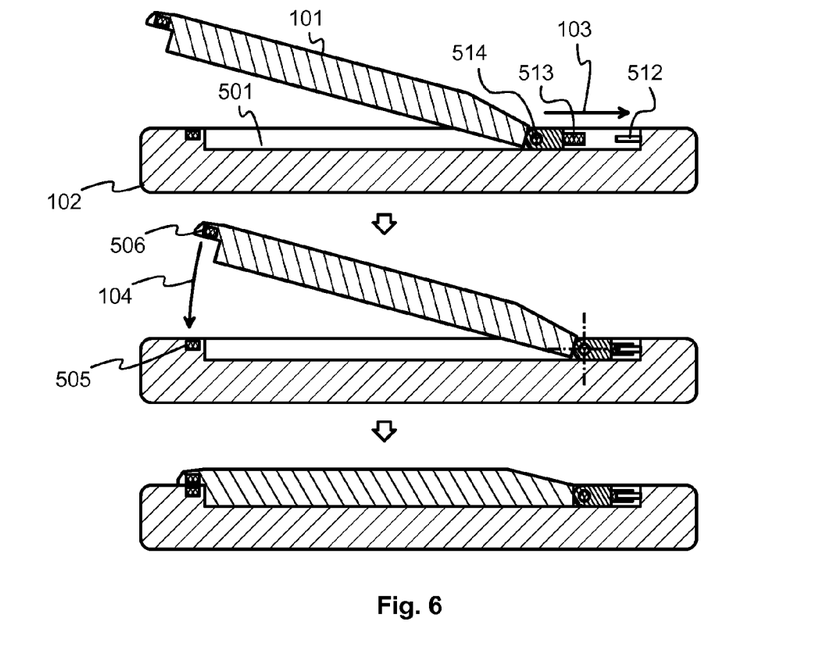
FIG. 6 illustrates another way of implementing the principle of FIG. 1 in practice.

FIGS. 5 and 6 illustrate two examples of practical ways of implementing an embodiment according to FIG. 1. The drawings are partial cross sections taken roughly along the middle longitudinal axes of the module 101 and the apparatus 102. We assume that the mechanical interface comprises a recess 501 in the apparatus 102, configured to receive the module at least partly inside the smoothly defined outline of the apparatus. An advantageous feature of a recess is its inherent ability of resisting shearing forces that would twist the module sideways when in the assembled configuration. If the recess has a wall that is essentially perpendicular against the longitudinal axis of the electric connector □ counterpart electric connector pair in the assembled configuration, and the module has a corresponding surface that rests against said wall in the assembled configuration, the module can not move in the direction that would tend to loosen the electric connection, unless the mechanical connection is broken first and the module is turned to get it out of the recess. Additionally a recess in the apparatus allows a significant volume of a module to be received inside the smoothly defined outline of the apparatus, which can be utilized to give the impression that the system consisting of an apparatus and a module in an assembled configuration is a unitary entity, despite of a relatively voluminous part of the functionalities having been added to the system by attaching the module.

In FIG. 5 the electric connector is a □male□ connector 502 at one end of the generally elongated shape of the module 101. The electric counterpart connector is a □female□ receptacle 503 at one end of said recess. The hinge joint comprises one or more axis pins 504 that connect the receptacle 503 to the body of the apparatus 102 and allow the receptacle to turn at least some degrees around the axis of rotation that equals the longitudinal axis of the axis pins 504. A spring, elastic pad, torsion rod or other mechanical biasing means cause the receptacle 503 to assume a slightly upwards pointing position, if nothing presses it flat against the bottom of the recess 501. In the upper part of FIG. 5 the slightly upwards pointing position is such that the longitudinal direction of the receptacle 503, which is simultaneously the natural insertion direction defined by the receptacle 503, differs by approximately 15 degrees from the longitudinal direction of the apparatus 102. The position of the connector 502 at the end of the module 101 is such that the longitudinal direction of the connector 502 is essentially aligned with the longitudinal direction of the module 101. The roles of connector and receptacle could be switched, so that there would be a connector in the apparatus and a receptacle in the module.

In the upper part of FIG. 5 the module 101 is shown to move in the direction 103, which is the first insertion direction, in relation to the apparatus 102. Moving the module 101 far enough in the first insertion direction 101 causes the receptacle 503 to receive the connector 502, as shown in the middle part of FIG. 5. This makes the electric connection between the module 101 and the apparatus 102. Next, the module is put into a rotating movement counterclockwise around the axis of rotation defined by the axis pin(s) 504. This causes the free end of the module 101 to approach the apparatus 102 in the second insertion direction 104. The mechanical connector in the apparatus 102 is a piece of ferromagnetic material 505, and the counterpart mechanical connector in the module 101 is a magnet 506. The roles could be reversed so that the apparatus could comprise a magnet and the module a piece of ferromagnetic material that is not permanently magnetic, or both could be magnets. The term magnet refers here both to a permanent magnet and to a switchable magnet, such as an electromagnet. The polarity of the magnets, if used, is selected so that close to each other they pull each other. If one of the elements 505 and 506 is a magnet and the other is a piece of ferromagnetic material that is not permanently magnetic, similar pulling is caused irrespective of the polarity of the magnet. Shielding structures, such as metallic plates or the like, can be used (but are not separately shown in FIG. 5) adjacent to magnets in order to shape and direct the magnetic field lines in a more advantageous way.

Bringing the module 101 close enough to the apparatus 102 in the second insertion direction 104 in FIG. 5 causes an increasing magnetic pull, which ultimately will snap the module 101 and the apparatus 102 together in the assembled configuration shown in the lowest part of FIG. 5. In the assembled configuration the magnetic pull is so strong that it maintains the assembled configuration under small and medium-dimensioned loads. Thus we may say that the mechanical connector in the apparatus has received the matching counterpart mechanical connector in the module, and such receiving has taken place in the second insertion direction. Small and medium-dimensioned loads mean that for example turning the apparatus upside down or slightly shaking it by hand will not cause the magnetically locked end of the module to break loose.

Using a mechanical connector based on magnetism has several advantages. Many human users perceive a magnetically controlled movement as representing high quality and convenience, compared to levers, slides, claws and the like that must be actually moved with fingers to operate. The magnet-based mechanical connection does not involve any moving parts, which makes it simple to manufacture and essentially prevents any weakening performance that would be caused by mechanical wear. Under a sudden high load, caused by for example the impact of a falling apparatus against the floor, the magnet-based mechanical connection may detach in a controlled manner and without breaking any parts of the structure. A magnet and a counter plate can be small; for example it has been observed that a magnet of the size of 10×4×1.8 millimeters and a matching metallic counter plate of the thickness of 0.7 mm can provide a strong enough pull to necessitate an opening force in excess of 11 newtons.

FIG. 6 illustrates a variation in which the hinge joint is in the module rather than in the apparatus. The module 101 and apparatus 102 can be otherwise the same as in FIG. 5, with changes only applying to the implementation of the electric connection. A connector 512 is located at one end of the recess 501 and directed essentially parallel to the longitudinal direction of the recess 501. A receptacle 513 is located at one end of the module 101 and connected to the module 101 through a hinge joint, which comprises at least one axis pin 514. The first insertion direction 103 is now parallel to the longitudinal direction of the recess 501 (and of the apparatus 102 as well). The second insertion direction 104 is the direction of the rotating movement around the axis pin(s) 514. The mechanical connection is made magnetically like in the embodiment of FIG. 5.

Figure 7:
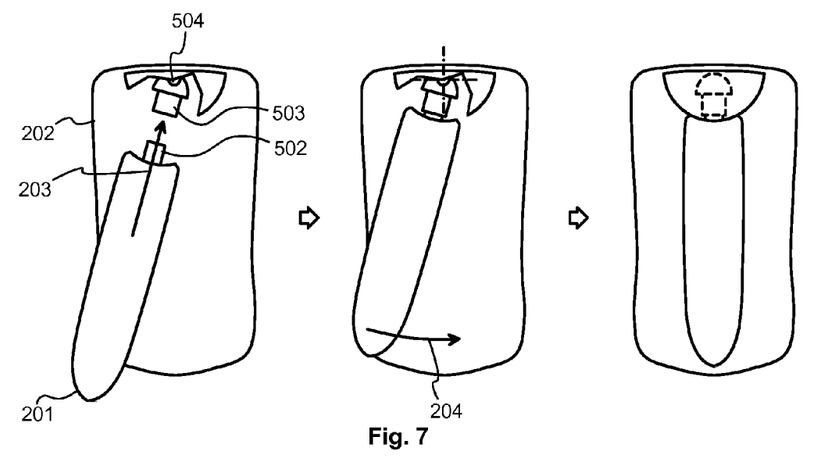
FIG. 7 illustrates one way of implementing the principle of FIG. 2 in practice.
Figure 8:
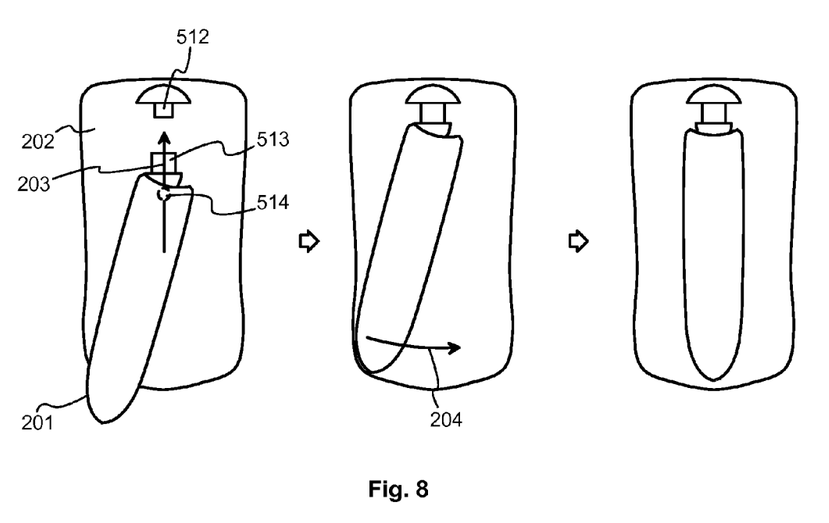
FIG. 8 illustrates another way of implementing the principle of FIG. 2 in practice.

FIGS. 7 and 8 illustrate two examples of practical ways of implementing an embodiment according to FIG. 2. In FIG. 7 there is a □male□ connector 502 fixedly attached to one end of the module 201, and a □female□ receptacle 503 connected to the apparatus 202 through a hinge joint that comprises an axis pin 504. A cover part in the apparatus has been shown partially cut away in the leftmost and middle parts of FIG. 7 to better illustrate making the electric connection, which takes place as a response to moving the module in the first insertion direction 203. Rotating the module counterclockwise in the second insertion direction 204 leads to the assembled configuration shown in the rightmost part of FIG. 7. The roles of connector and receptacle could naturally be switched. The variation of FIG. 8 illustrates a connector 512 fixedly connected to the apparatus 202, as well as a receptacle 513 coupled to the module through the hinge joint that comprises an axis pin 514. The mechanical connector and counterpart mechanical connector are not separately shown in FIGS. 7 and 8. For example a similar mechanical connector based on magnetism as in FIGS. 5 and 6 can be used, because the magnetic pull that occurs between two aligned magnets (or a magnet and piece of ferromagnetic material) resists shear (i.e. sideways movement of the free end of the module) much in the same way as it resists a direct pull apart. Also any of the alternatives discussed in more detail later in this description can be used.

Figure 9:
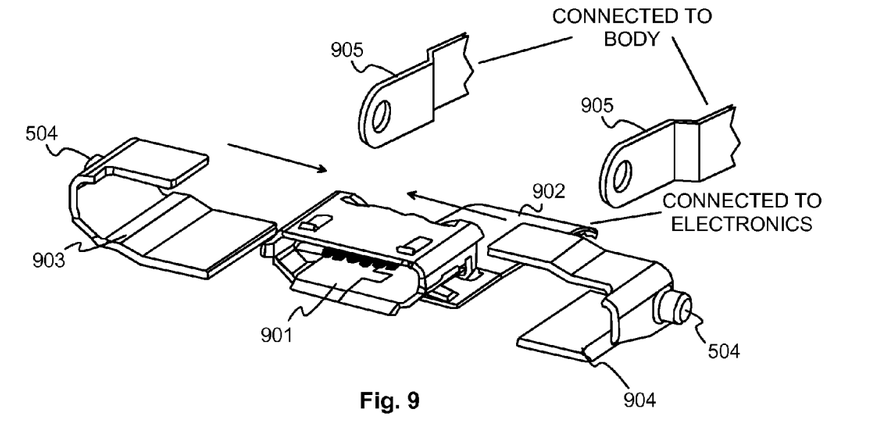
FIG. 9 illustrates a connector with a hinge cover.

FIG. 9 illustrates an exemplary way of providing a hinge joint in association with an electric connector. The drawing illustrates a female receptacle 901, in this case particularly of the A-B µUSB (micro USB; Universal Serial Bus) type, but the same principle is applicable irrespective of what is the actual connector type. The microversion of the standardized USB connectors has all advantages of the larger USB connectors and is additionally relatively small, which makes it a good choice for applications where tight spatial limitations apply. The receptacle 901 is electrically and mechanically connected to a flexible circuit board 902, which is frequently referred to as a flex. Instead of or in addition to a flex an electric wire or a (typically flat) cable consisting of a number of electric wires could be used; all these and other suitable alternatives can be commonly referred to as a flexible conductor. The flexible conductor is mainly there for providing the electric connection to some further circuitry (not shown). The flexible conductor can also be the mechanical biasing means referred to earlier. Some other point of the flexible conductor is connected to a main circuit board or otherwise to a main body of the device equipped with the hinged electric connector, and the connecting locations may be selected so that the flexible conductor is bent into a shape in which its material causes a natural tendency of changing its shape and thus of tilting the hinged connector.

In order to implement the hinge joint, the receptacle 901 is enclosed in a so-called hinge cover, which in this embodiment consists of a left half 903 and a right half 904 that are pushed and snapped together with the receptacle 901 remaining between them. Axis pins 504 at the sides of the left and right halves will fit corresponding round holes or cylindrical hollows in a support structure 905 that is fixedly attached to the main body of an apparatus or a module, depending on whether the hinge joint should be implemented in the apparatus or module respectively. The left and right halves of the hinge cover are most advantageously made of plastic or other material that is elastic enough to implement a snap joint or other practical way of locking the left and right halves together. In order to implement the hinge joint, a natural alternative to axis pins 504 in the hinge cover would be to have pins in the support structure 905 and corresponding holes or hollows in the halves of the hinge cover.

The matching counterpart electric connector for the particular electric connector of FIG. 9 would be an μUSB male connector, fixedly attached to the other part of the system (to the module, if the hinged connector is in the apparatus, and correspondingly to the apparatus, if the hinged connector is in the module). For example a standard surface-mounted male μUSB connector could be used.

Using an electric connector pair consisting of an A-B μUSB receptacle and a surface-mounted μUSB plug involves many advantageous features. The widespread use of USB connections means that suitable connectors are readily available at a reasonable price, and compatibility with a large number of potential other devices is good. The inclusion of a relatively highly rated power feed line in the USB standard means that if the apparatus is capable of feeding power to the module, the connection can be used to charge a battery or other electric energy reservoir in the module. The USB standard supports plug-and-play and hot-plugging type of operations. The connectors are relatively small in size, which saves space in the devices. The version of the USB standard that is in use at the date of writing this description supports up to 480 Mbit/s data transfer speeds, which is more than enough for most purposes. Considerations to make involve the fact that USB on-the-go implementation is required for direct communication, which in practice may limit the current feed capability (an exemplary combination of values being 100 mA at 5V). Also the presently known form of USB does not support isochronous data transfer for real-time audio or video.

A hinge cover does not need to consist of two halves, and it does not need to completely enclose the electric connector from all sides. In one alternative embodiment the hinge cover could be just a cover plate attached to the top or bottom side of the electric connector, even so that the flexible conductor would be attached to the cover plate and not the electric connector. The cover plate would thus act both as a hinged mechanical support for the electric connector and as an electric interface between the electric connector and the flexible conductor.

Figure 10:
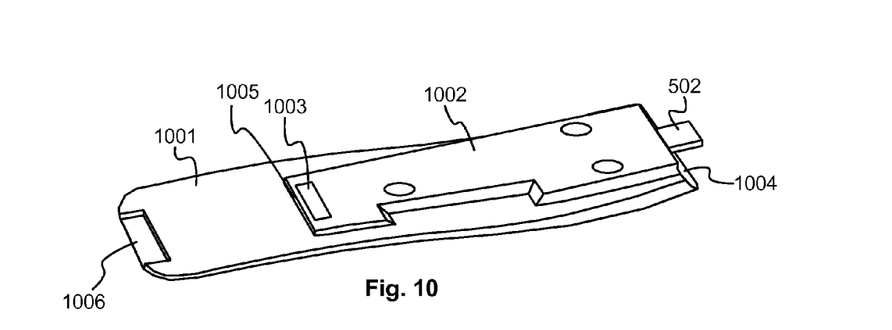
FIG. 10 illustrates a module.

FIG. 10 illustrates an example of a module, with that part of the module clearly visible that constitutes the mechanical interface for connecting the module to an apparatus. The module comprises a cover part 1001, which in the assembled configuration will remain visible outside the apparatus and which will ☐ together with the outer cover of the apparatus ☐ constitute the outer appearance of the system where an apparatus and a module are in assembled configuration. On that side of the cover part 1001 that is meant to confront the apparatus, the module comprises a housing part 1002, which is meant to be received in a recess in the mechanical interface of the apparatus and which houses some functional components of the module. At one end of the housing part 1002 the connector 502 protrudes in a direction essentially parallel with the longitudinal axis of the module. A metal plate 1003 covers a magnet (not shown) at the other end of the housing part 1002. The effect of the metal plate 1003 is to shape and direct the magnetic field so that even if in the direction directly out of the surface of the metal plate 1003 the magnetic field is sufficiently strong to make a good mechanical connection, in other directions the magnetic field is very small, like less than 50 milliteslas. The limiting surface 1004 of the module in that end where the connector 502 is located is curved, for reasons seen more clearly in FIG. 11. One limiting surface 1005 of the housing part is perpendicular against the longitudinal axis of the connector 502 (and thus against the longitudinal axis of the whole module as well); this is the surface that should rest against a corresponding surface of the recess in the apparatus (not shown) and to prevent movements that would tend to loosen the electric connection. At the end of the module located farthest away from the connector 502, a slot 1006 is provided, to which a user may push a fingernail or other flat object for facilitating easy removal of the module from the apparatus when desired.

Figure 11:
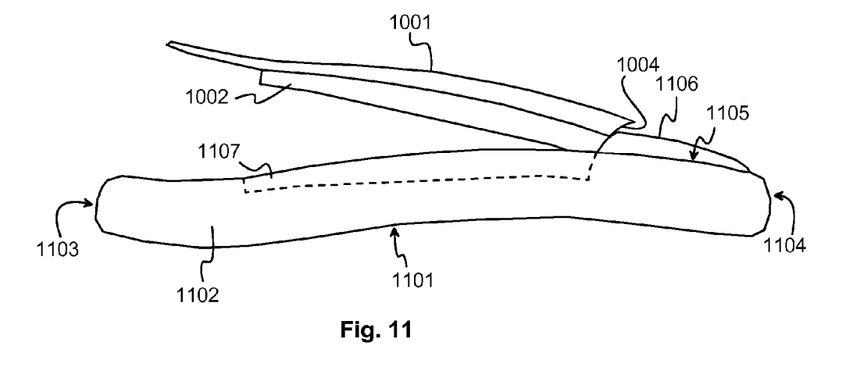
FIG. 11 illustrates a system comprising an apparatus and a module.
Figure 12:
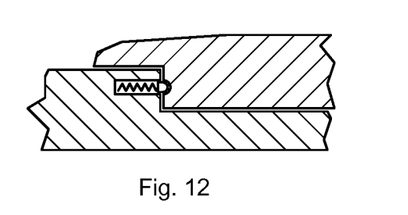
FIG. 12 illustrates a mechanical connector □ counterpart mechanical connector pair.
Figure 13:
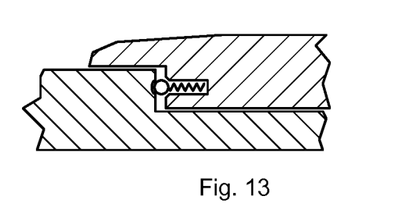
FIG. 13 illustrates another mechanical connector □ counterpart mechanical connector pair.
Figure 14:
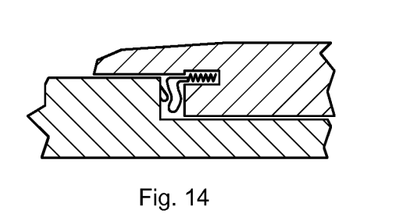
FIG. 14 illustrates another mechanical connector □ counterpart mechanical connector pair.

FIG. 11 is a side view of a system where an apparatus and a module have their electric connection made, but not the mechanical connection, because the left end of the module is free and not pressed against the apparatus. The module is similar to that shown in FIG. 10, and we assume that it is attached to the back of the apparatus. The smoothly defined outer surface of the apparatus comprises a slightly curving but otherwise flat front surface 1101, essentially flat side surfaces of which side surface 1102 is visible, and end surfaces 1103 and 1104. On the back side of the apparatus said smoothly defined outer surface comprises a surrounding area 1105 which is similarly slightly curving but otherwise flat as the front surface 1101. In the middle of one end on the back side there is a central ridge 1106. Adjacent to, and extending from the central ridge towards the other end of the back side is a recess 1107 configured to receive the housing part 1002 of the module inside the smoothly defined outer surface of the apparatus. The side of the central ridge 1106 that faces the recess 1107 is curved with the same radius of curvature as the limiting surface 1004 of the module. The central point of the curvature is approximately on the axis of rotation that is defined by the hinged joint between the electric connector and the body of the apparatus. Thus, when the apparatus and module are moved from the mutual position shown in FIG. 11 towards the assembled configuration, the limiting surface 1004 will slide smoothly along the curved surface of the central ridge 1106 until in the assembled configuration the smoothly defined outline of the assembled system comprises a continuous, smoothly curving form that continues from the central ridge 1106 to the visible portion of the cover part 1001 of the module.

The central ridge 1106 can be used to house some component of the apparatus that has relatively large space requirements in the direction that is seen vertical in FIG. 11. If the apparatus is e.g. a portable communications device, such component might be for example a camera module. The sides of the camera module would thus offer natural support for holding structures of the electric connector, like those illustrated as 905 in FIG. 9. The term ☐central ridge☐ refers to the fact that in the embodiment of FIG. 11 the ridge extends along the centre line of the back side of the apparatus, but it could also be called just the ridge to signify that the location is not that important.

FIGS. 12 to 15 illustrate various examples of mechanical connector ☐ counterpart mechanical connector pairs. The embodiments of FIGS. 12, 13, and 14 can be interpreted alternatively as spring-loaded or shape memory based solutions, in which a locking element in one part of the system is pressed into or against a corresponding formation in the other part in order to achieve locking. Release mechanisms based on push buttons, slides, levers, or other kinds of actuators (not shown) can be provided if the locking is so tight that simply pulling the parts away from each other is not enough to make the locking element loose from the corresponding formation.

Figure 15:
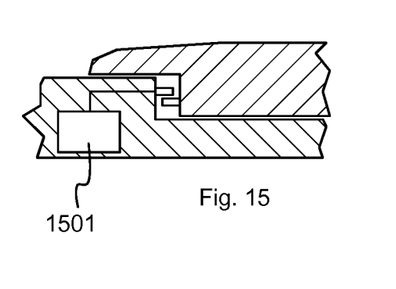
FIG. 15 illustrates another mechanical connector □counterpart mechanical connector pair.

FIG. 15 illustrates overlapping rebates, of which at least one may be flexible or retractable. Bayonets or latches can be used as locking mechanisms.

In some embodiments the mechanical connector □ counterpart mechanical connector pair may comprise an electrically controllable actuator and/or releasing mechanism, which is schematically illustrated as 1501 in FIG. 15. An advantage of an electrically controllable arrangement is the possibility of providing software control, so that the user may be requested to e.g. give a password or otherwise authenticate himself in order to attach and/or remove a module. Electrically controllable actuators and releasing mechanisms are known as such from other kinds of attachment arrangements.

A common feature of all embodiments described so far is that one exemplary implementation involves having a portable communications device (or the components for realising some functionalities of a portable communications device) as the apparatus and some additional functionalities in the module. Exemplary functionalities that could be implemented in such an apparatus part include but are not limited to cellular telephone functionality, digital camera functionality, protected subscriber identity storage functionality, personal digital assistant functionality, low-power local wireless communications functionality, and mobile electronic payment functionality. As examples, modules that can be attached to a portable communications device could include extra memory, digital identity storage with strong protection, camera, video camera, extension lens to camera, solar cell, extra battery, fuel cell, energy scavenging unit, environmental or health sensors, various antennas, flashlight, laser pointer, expansion CPU (central processing unit), micro projector, biometric recognition components, gaming or other recreational expansions, scent dispenser, enhanced connectivity units for e.g. car connections, and MP3 player or other audio feature components. Also a blank hatch could be used instead of any functional module, especially if there is a recess in the apparatus that should be covered. A recess of the above described kind in a portable communications device may provide direct access to components that must be exchangeable but not constantly in view, like memory units or subscriber identity modules, so that an attached module acts simultaneously as a cover that hides said components during normal use.

What was said above about portable communications devices can be generalized to portable devices in general. For example an electronic game, a personal digital assistant, a camera, a video camera, or a portable data terminal could be apparatuses according to embodiments of the invention.

Also in all embodiments, if the electric connector of the apparatus is easily enough accessible when there is no module attached, it can be used for implementing temporary wired connections between the apparatus and other electric appliances. For example, if the electric connector in the apparatus is a standardized USB receptacle and it is accessible to the male USB connector at one end of a USB connection cable, it is easy to make a connection between the apparatus and e.g. a personal computer or any other USB-equipped other apparatus by using a standardized cable.

An example in which the first connection is not an electronic connection could involve a case in which one of the devices is electric but the other is not, at least not to the extent of needing an electric connection. For example, the range of add-on modules designed for and available to an electronic device could include both electric add-on modules and purely mechanical ones. In order to use the same mechanical interface for them all, at least one of what has been referred to as the first connector and the first matching counterpart earlier could be a □dummy□ connector, with the same size and shape as a corresponding standardized electric connector but being completely made of plastic or other non-conductive material. An example of that kind of situation could be a portable communications device, to which the user may attach an expansion memory module during the work hours and a scent dispenser module for evenings.

It could be advantageous to have the mechanical interface standardized, with the electromechanical connection and all, or at least available for controlled utilization so that accredited manufacturers would be allowed to build and market modules of their own construction for use together with apparatuses.

The foregoing explanation of exemplary embodiments should not be construed as limiting to the scope and applicability of the following claims. Features that are described in association with a particular embodiment can be combined and used in various ways together with other embodiments unless it is clear that a characteristic of some feature excludes any possibility of using it in any other embodiment.

The invention claimed is:

1. An apparatus, comprising:
    mechanical interface configured to mechanically receive a module into an assembled configuration,
    within said mechanical interface, a first connector configured to receive a first matching counterpart in a first insertion direction,
    within said mechanical interface, a second connector configured to receive a second matching counterpart in a second insertion direction, which second insertion direction is the direction of a curvilinear motion and different from said first insertion direction, and
    a hinge joint between said first connector and a body of the apparatus;
    wherein said hinge joint has an axis of rotation, which is essentially perpendicular against said second insertion direction, and wherein said first connector is an electric connector.

2. An apparatus according to claim 1, wherein said second connector is a mechanical connector.

3. An apparatus according to claim 1, wherein said mechanical interface defines a recess in the apparatus, said recess being configured to receive the module at least partly inside a smoothly defined outline of the apparatus.

4. An apparatus according to claim 3, wherein a limiting surface of said recess is a wall that is perpendicular with a longitudinal axis of the first connector first matching counterpart pair in the assembled configuration.

5. An apparatus according to claim 3, wherein the apparatus comprises a ridge adjacent to said recess, and wherein a side of the ridge that faces said recess is curved, with the central point of the curvature being located on the axis of rotation that is defined by the hinge joint between the first connector and the body of the apparatus.

6. An apparatus according to claim 1, wherein the mechanical interface is elongated in shape and wherein the first connector and second connector are located closer to opposite ends of said elongated shape than to each other.

7. An apparatus according to claim 1, comprising:
    a flexible conductor connected to both the first connector and to a main body of the apparatus,
    a hinge cover configured to enclose the first connector,
    a support structure fixedly attached to the main body of the apparatus, and
    axis pins and corresponding holes or hollows that implement a hinge joint between the hinge cover and the support structure.

8. An apparatus according to claim 7, wherein the flexible conductor is bent into a shape in which its material causes a natural tendency of changing said shape.

9. An apparatus according to claim 1, wherein the electric connector is a USB receptacle.

10. An apparatus according to claim 1, wherein the second connector is a piece of ferromagnetic material configured to act as one half of a mechanical connection based on magnetism.

11. An apparatus according to claim 1, wherein the apparatus is a portable device.

12. An apparatus according to claim 1, wherein the apparatus is a portable device, and wherein the module comprises digital identity storage.

13. An apparatus according to claim 1, wherein the second insertion direction is substantially different from said first insertion direction.

14. A module, comprising:
a first matching counterpart configured to be received in a first connector of an apparatus in a first insertion direction, and
a second matching counterpart configured to be received in a second connector of the apparatus in a second insertion direction, which second insertion direction is the direction of a curvilinear motion and different from said first insertion direction, wherein the first matching counterpart is an electric connector.

15. A module according to claim 14, wherein the second matching counterpart is a mechanical connector.

16. A module according to claim 14, comprising:
a cover part, configured to remain visible and constitute a part of the outer appearance of a system in an assembled configuration where the module is in electromechanical connection with the apparatus, and
on that side of the cover part that is configured to confront the apparatus, a housing part, which is configured to be received in a recess in a mechanical interface of the apparatus and which houses functional components of the module.

17. A module according to claim 14, wherein the module is an add-on module of a portable device.

18. A module according claim 14, wherein the module comprises at least one of the following: extra memory, digital identity storage, camera, video camera, extension lens to camera, solar cell, extra battery, fuel cell, energy scavenging unit, environmental sensor, health sensor, antenna, flashlight, laser pointer, expansion central processing unit, micro projector, biometric recognition component, gaming expansion, scent dispenser, enhanced connectivity unit, MP3 player.

* * * * *